(12) United States Patent
Baluja

(10) Patent No.: US 7,903,099 B2
(45) Date of Patent: Mar. 8, 2011

(54) ALLOCATING ADVERTISING SPACE IN A NETWORK OF DISPLAYS

(75) Inventor: Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1318 days.

(21) Appl. No.: 11/155,881

(22) Filed: Jun. 20, 2005

(65) Prior Publication Data
US 2006/0287913 A1  Dec. 21, 2006

(51) Int. Cl.
*G06F 3/038* (2006.01)
(52) U.S. Cl. .......... 345/204; 345/1.1; 705/14.4; 709/207
(58) Field of Classification Search ............ 345/1.1, 345/204, 1, 3, 1.3; 705/14, 14.4, 14.49, 14.64, 705/14.73; 40/624; 709/207
See application file for complete search history.

(56) References Cited

U.S. PATENT DOCUMENTS

| | | | |
|---|---|---|---|
| 5,636,346 A | 6/1997 | Saxe | |
| 5,689,648 A * | 11/1997 | Diaz et al. ................ | 705/26 |
| 5,724,521 A | 3/1998 | Dedrick et al. | |
| 5,845,265 A | 12/1998 | Woolston | |
| 5,918,010 A | 6/1999 | Appleman et al. | |
| 5,920,854 A | 7/1999 | Kirsch et al. | |
| 5,931,901 A | 8/1999 | Wolfe et al. | |
| 5,974,398 A | 10/1999 | Hanson et al. | |
| 6,026,368 A | 2/2000 | Brown et al. | |
| 6,044,375 A | 3/2000 | Shmueli et al. | |
| 6,061,659 A | 5/2000 | Murray | |
| 6,067,570 A | 5/2000 | Kreynin et al. | |
| 6,078,866 A | 6/2000 | Buck et al. | |
| 6,215,411 B1 | 4/2001 | Gothard | |
| 6,223,163 B1 | 4/2001 | Van Luchene | |
| 6,247,009 B1 | 6/2001 | Shiiyama et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,324,519 B1 | 11/2001 | Eldering | |
| 6,336,132 B2 | 1/2002 | Appleman et al. | |
| 6,384,736 B1 | 5/2002 | Gothard | |

(Continued)

FOREIGN PATENT DOCUMENTS

EP   1026610 A2   8/2000

(Continued)

OTHER PUBLICATIONS

Email Disclosure of Jan. 19, 2007.

(Continued)

*Primary Examiner* — Kimnhung Nguyen
(74) *Attorney, Agent, or Firm* — Fish & Richardson P.C.

(57) ABSTRACT

Systems and methods for allocating space for advertisements in a network of electronic display devices are provided. Attribute information indicating retailer and categories of products available for purchase in the vicinity of a display device is maintained for each device in a database. Advertisers may upload advertisement messages to a server specifying information such as budget, price per impression, preferred billboards and/or other constraints. One or more keywords or other descriptors are specified for each advertisement message. The system then generates an advertising campaign specifying where the advertisement message is to be output and send the messages to the specified displays. The output may consist of various forms including video, audio, printed incentive, interactive data transfers and/or combinations of these.

32 Claims, 8 Drawing Sheets

U.S. PATENT DOCUMENTS

| | | |
|---|---|---|
| 6,421,675 B1 | 7/2002 | Ryan et al. |
| 6,430,605 B2 * | 8/2002 | Hunter .......................... 709/207 |
| 6,804,659 B1 | 10/2004 | Graham et al. |
| 2001/0042064 A1 | 11/2001 | Davis et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0055880 A1 | 5/2002 | Unold et al. |
| 2002/0077891 A1 | 6/2002 | Castle et al. |
| 2002/0099605 A1 | 7/2002 | Weitzman et al. |
| 2002/0111898 A1 | 8/2002 | Numaoka et al. |
| 2002/0123988 A1 | 9/2002 | Dean et al. |
| 2002/0147645 A1 * | 10/2002 | Alao et al. ...................... 705/14 |
| 2002/0151126 A1 * | 10/2002 | Jacquet .......................... 438/200 |
| 2002/0156858 A1 * | 10/2002 | Hunter .......................... 709/207 |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0037334 A1 | 2/2003 | Khoo et al. |
| 2003/0070167 A1 | 4/2003 | Holtz et al. |
| 2003/0083937 A1 | 5/2003 | Hasegawa et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Iino et al. |
| 2004/0095339 A1 | 5/2004 | Gothard |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0167928 A1 | 8/2004 | Anderson et al. |
| 2004/0249709 A1 | 12/2004 | Donovan et al. |
| 2005/0065806 A1 | 3/2005 | Harik |
| 2005/0071224 A1 | 3/2005 | Fikes et al. |
| 2005/0096979 A1 | 5/2005 | Koningstein |
| 2005/0131758 A1 | 6/2005 | Desikan et al. |
| 2005/0131762 A1 | 6/2005 | Bharat et al. |
| 2005/0144069 A1 | 6/2005 | Wiseman et al. |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |
| 2006/0041538 A1 * | 2/2006 | King et al. ...................... 707/3 |
| 2009/0063283 A1 * | 3/2009 | Kusumoto et al. .............. 705/14 |

FOREIGN PATENT DOCUMENTS

| | | |
|---|---|---|
| WO | WO 0038074 | 6/2000 |
| WO | WO 2004/042525 | 5/2004 |

OTHER PUBLICATIONS

Google Introduces New Pricing For Popular Self-Service Online Advertising Program, http://www.google.com/press/pressrel/select.html, p. 1-2, dated Feb. 20, 2002, printed on Jul. 29, 2003. (electronic copy on enclosed CD).

Collection of pages from www.overture.com, printed on Jul. 29, 2003. (electronic copy on enclosed CD).

Collection of pages from findwhat.com, http://www.findwhat.com, printed on Jul. 29, 2003. (electronic copy on enclosed CD).

Collection of pages from Sprinks.com, http://www.sprinks.com, printed on Jul. 29, 2003. (electronic copy on enclosed CD).

Collection of pages from Kandoodle.com, http://www.kanoodle.com, printed on Jul. 29, 2003. (electronic copy on enclosed CD).

Collection of pages from Google Advertising, http://www.google.com, printed on Jul. 29, 2003. (electronic copy on enclosed CD).

Chris Sherman, "Google Launches AdWords Select," Feb. 20, 2002, 6 pages.

* cited by examiner

US 7,903,099 B2

ALLOCATING ADVERTISING SPACE IN A NETWORK OF DISPLAYS

FIELD OF THE INVENTION

The present invention relates to allocation of advertising and other documents over a distributed network of electronic output devices based on a geographic location.

BACKGROUND OF THE INVENTION

Advances in technology have created new advertising channels to promote products and services. One example of this are kiosk-type billboards typically located in retail outlets, such as shopping malls, airports, hotel lobbies, etc. In their simplest form these devices loop through a series of poster-type advertisements promoting, movies, products and/or retail outlets in proximity to the sign to induce specific customer behavior. Usually these billboards execute a predetermined cycle whereby each advertisement is displayed for predetermined time period before the device automatically cycles to the next advertisement in the loop. Changes in the content of such a billboard are made by physically changing the roll of printed advertisements that provides the loop or modifying the electronic content of the advertisements for electronic billboards. Therefore, management of a system of these kiosk-type billboards is difficult. Furthermore, sale of advertising space and creation of an effective advertising campaign within a given budget in such a system is also complicated due to the distributed nature of the billboards. Other problems with existing billboard technologies also exit.

SUMMARY OF THE INVENTION

Accordingly, at least one exemplary embodiment may provide a method for allocating space for advertisement messages in a network of electronic display devices. The method for allocating advertisement messages in a network of electronic display devices according to this embodiment may comprise defining a set of display attributes associated with a plurality of displays in the network, associating a document with at least one concept, selecting at least one document to output to a display based on the display attributes and the at least one concept associated with the document, and outputting the document to the display.

In another exemplary embodiment, a system may be provided. The system according to this embodiment may provide a database system that defines a set of display attributes associated with a plurality of displays in a network and associates a document with at least one concept, a document selection module that selects at least one document to output to a display based on the display attributes and the at least one concept associated with the document and a document output module that outputs the selected document for presentation at the display.

Yet another exemplary embodiment may provide an automated targeted marketing system. The automated targeted marketing system according to this embodiment may comprise a network of geographically distributed electronic billboards, each electronic billboard associated with one or more attributes, a data base of advertisement messages, each advertisement message associated with at least one keyword, a selection means adapted to one or more electronic billboards from which to output an advertisement message based on a correlation between the at least one key word and the one or more attributes and an advertiser specified budget.

In still an additional embodiment, an automated method for creating and advertising campaign in an ad network of distributed electronic billboards may be provided. The automated method for creating an advertising campaign in an ad network of distributed electronic billboards according to this embodiment may comprise receiving an advertisement message and a budget from an advertiser, associating the advertisement message with at least one product category or keyword, and selecting one or more electronic billboards on which to output the advertisement message based on at least (1) a correlation between the at least one product category or keyword and attributes of the one or more electronic billboards, and (2) the budget.

These and other embodiments and advantages of the present invention may become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving systems and methods for managing a distributed advertising network of electronic billboards and allocating advertising space in this network based on the proximity of each billboard to categories of retail outlets. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

System Overview

Figure 1:
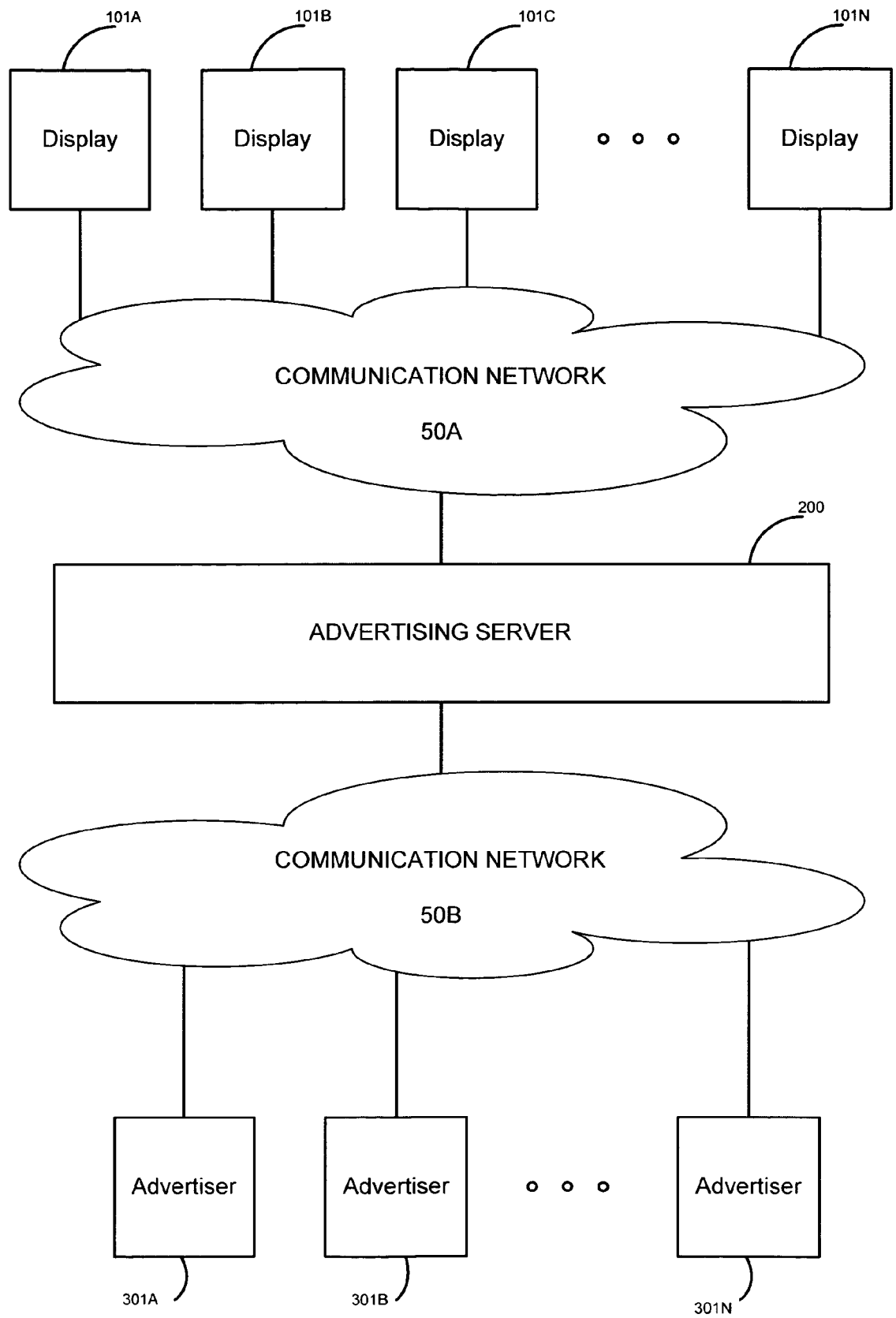
FIG. 1 is a block diagram illustrating various components of a system for managing a distributed network of electronic billboards and a for allocating advertising space in the network based on a correlation between products/concepts promoted in an advertising message and attributes of the each billboard according to at least one embodiment of the invention.

Referring now to FIG. 1, an exemplary electronic billboard-based distributed advertising network for performing intelligent allocation of advertising space is illustrated in accordance with various embodiments. In the exemplary system of FIG. 1 there are a plurality of displays 101A, 101B, 101C, . . . , 101N geographically distributed throughout an area, such as, for example, a shopping area, a city, a region, a state, etc. In various embodiments, each display 101A, 101B, 101C, . . . , 101N may communicate with an advertising server 200 over a communication network 50A. In various embodiments the communications network may be a distributed public network such as the Internet, a private network such as a W-LAN, or other suitable communication network. In various embodiments, the individual displays 101A, 101B, 101C, . . . , 101N may communicate with the advertising server 200 to receive advertisements, to receive advertisement message output schedules and to perform administrative functions.

A plurality of advertisers 301A, 301B, . . . , 301N may also communicate with the advertising server 200 over a communications network 50B. In various embodiments, communication networks 50A and 50B may be the same network, however, in various other embodiments, 50A and 50B may be different networks. In various embodiments, advertisers 301A, 301B, . . . , 301N may communicate with the advertising server 200 for a number reasons, including, but not limited to, purchasing advertisement space, uploading advertisement messages and/or other documents, registering, selecting attributes and/or key words associated with their advertisements, and other functions.

It should be appreciated that the system depicted in FIG. 1 shows a single advertising server 200 for ease of illustration purposes only. Various embodiments may employ multiple distributed advertising servers in a manner that is either apparent or transparent to the electronic billboards and advertisers interacting with the system.

Displays 101A, 101B, 101C, . . . , 101N may comprise a display screen, such as, for example, an LCD display screen, a plasma display screen, a CRT display screen, a projection display screen or a holographic-type display, and may, in various embodiments comprise electronic billboard devices. In various embodiments, displays may also include speakers or other audio output devices. In various embodiments, the displays may also comprise one or more printer devices for printing out incentives related to advertisements output by the display or for printing other materials. In various embodiments, the displays may also include one or more interactive features which allow viewers to interact with the display to obtain more information about products promoted in an advertisement message output by the display, to download incentives related to products, to supply information about themselves, or perform other interactive operations.

In various embodiments of the invention, advertisement messages may include text, graphics, video, audio, printed materials, electronically downloadable incentives or any combinations thereof. Thus, the word "output" in the context of this application may be understood broadly to refer to outputting graphics, still images, audio, video, printed materials, and combinations of the same or all of these. In addition, as noted above, the displays 101A, 101B, 101C, . . . , 101N may include an LCD panel, a plasma display panel, a projection-type display, an LCD projection display, a tube-type display, a touch screen type display or any other form of display. It should be appreciated that different displays 101 may employ different types of display screens and different configurations of speakers, printers and other devices having differing capabilities depending upon location and application.

It should be appreciated that while advertisement messages are used herein as exemplary embodiments of the invention, any document may be used in accordance with the various embodiments. For instance, documents such as advertisements, content pages (e.g., web pages), search results, emails, applications, IM messages, audio content or files, video content or files (e.g., television programming), other files, other data or applications that may reside on one or several (e.g., a network) of computer systems, or other definable concepts or content may be used. Thus, although the use of advertisement messages are described herein as examples, other documents such as web pages may be targeted to viewers and displayed in accordance with the various embodiments, e.g., as described herein with respect to advertisement messages.

It should also be understood that an advertisement message as used herein may comprise audio and/or video signals, static and/or dynamic images, graphics, video, film, or other content that relate to one or more products, services, and/or entities, such as commercial entities. Advertisement messages may comprise various visual features, including animation, sound, etc., and may also include text, such as in a text advertisement. Advertisement messages may also comprise any other promotional content or object, such as printed flyers (e.g., with maps to locations of advertising businesses), printed coupons, trinkets, gimmicks, clothing (e.g., T-shirts printed with a promotional message), candy, food, samples (e.g., product samples), and other items. Thus, the term "advertisement message" is used herein in its broadest sense to include any content or object intended for observation, use, or consumption by one or more persons for the purpose of marketing or promoting a product or service. While Advertisement messages are used for exemplary purposes, it should be understood that any audio and/or video content, such as television programming, may be used with the systems and methods described herein.

Exemplary System Architecture

Figure 2:
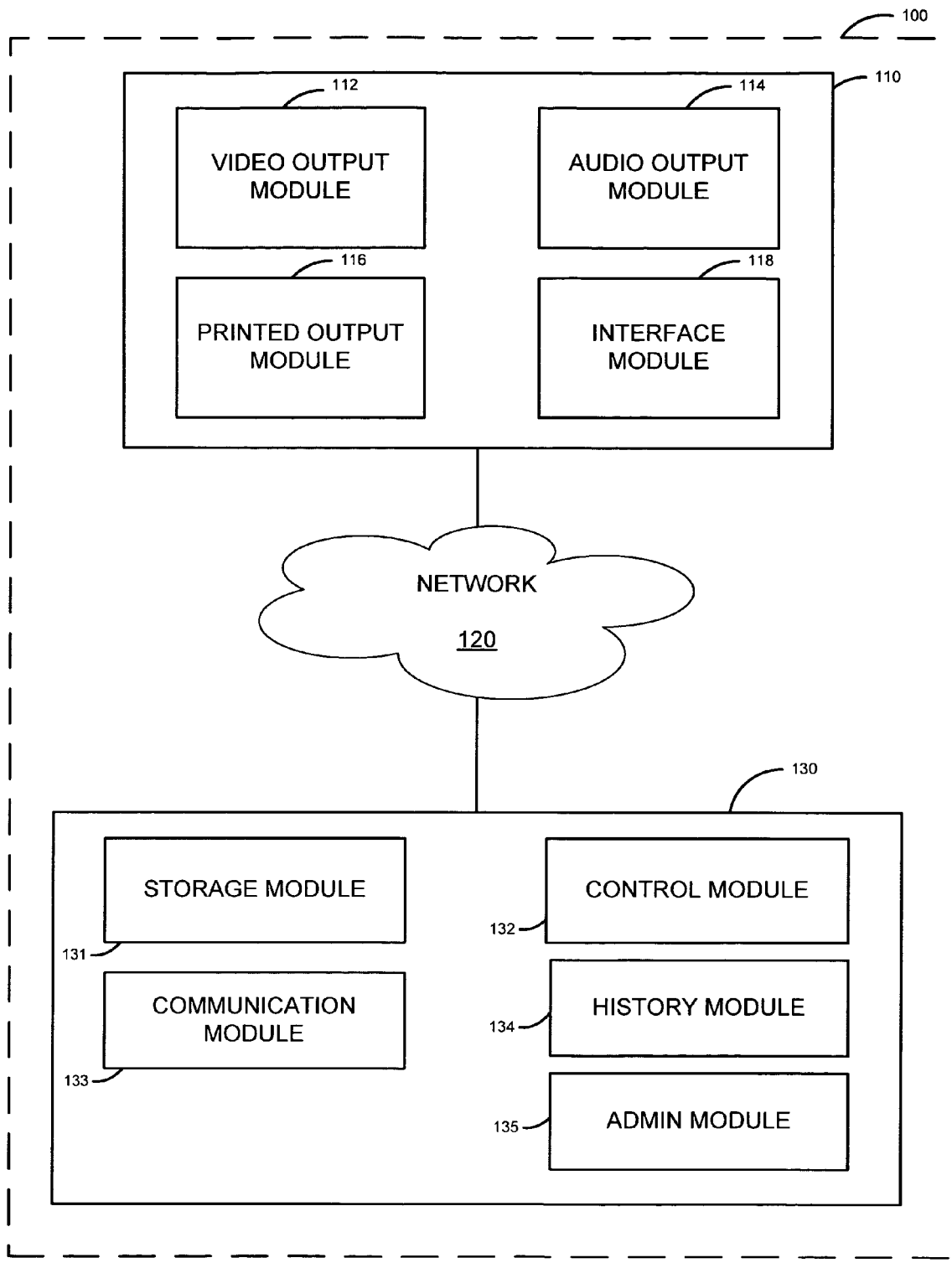
FIG. 2 is a block diagram illustrating various components of an electronic billboard according to at least one embodiment of the invention.

Referring now to FIG. 2, a block diagram illustrating various components of an exemplary display according to at least one embodiment of the invention is depicted. For sake of consistency and ease of explanation the display of FIG. 2 will herein be described as an electronic billboard. However, it should be appreciated that this naming convention is not intended to limit the scope of various embodiments discussed herein. The electronic billboard 101 comprises various modules and databases which may provide functionality that enables the billboard to display advertisement messages based on a correlation between the products/concepts promoted in the advertisement messages and the products and/or categories of products available for purchase in the vicinity of the electronic billboard 101. It should be appreciated that each module may be configured as a software application executing on computer hardware, an application specific integrated circuit (ASIC), a combination of hardware and software, or other suitable configuration. Moreover, modules may be combined or broken into multiple additional modules.

As depicted in FIG. 2, the electronic billboard 101 may comprise a front end portion 110 comprising a video output module 112, an audio output module 114, a printed output module 116 and/or an interface module 118. In various embodiments, video output module 112 may outputs still or moving video images on an integral display screen of the electronic billboard 101. In various embodiments, the display screen may comprise a LCD-type screen, a plasma screen, a projector screen, a CRT screen or holographic display device. In various embodiments, audio output module 114 may comprise one or more audio loudspeaker devices that output audio including speech, music and/or other sound effects that may or may not be correlated to the output of video output module 112. In various embodiments, the printed output module 116 may print out incentives relating to advertisements output by the billboard 110, may print out maps relating to the area surrounding the electronic billboard 110 or may print out other printed materials. In various embodiments, the interface module 118 may comprise a card reader for registering viewers with the system, a card writer for downloading electronic incentives to a memory device of the card, a touch screen operable to enable the viewer to interact with advertisement messages or an activation device, such as, for example, a pointing device and/or a keyboard.

The electronic billboard device 101 depicted in FIG. 2 may also comprise a back end portion 130 comprising one or more of the following: a storage module 131, a control module 132, a communications module 133, a history module 134 and/or an administrative module 135. It should be appreciated that the list of modules is exemplary only and that various embodiments may use more, less or even different modules. In various embodiments, the back end portion 130 will be internal to the billboard device 101 and therefore, transparent or invisible to the user. In various embodiments, the storage module 131 may store a plurality of advertisement messages received from the advertising server over the communication module 133 along with a schedule including information such as when and how many times particular advertisement messages are to be output. In various embodiments, the history module 134 stores a history of advertisement messages output by the electronic billboard. In various embodiments, this information may be uploaded to the advertising server over the communication module 133 either at regular periodic intervals, at random intervals or on demand, in response to a command received from the advertising server. In various embodiments, the administration module 135 may perform various administrative functions. In various embodiments, the communications module 133 may communicate with the advertising server over a network communication line such as with an Ethernet card, a wireless network protocol such as 802.11x, or even over plain old telephone service (POTS) lines using analog or xDSL modem technology.

In various embodiments, the front end portion 110 and the back end portion 130 may be interconnected by a network 120. In various embodiments, this may comprise a wired connection between the front end portion 110 and the back end portion 130, such as, for example, if the back end portion 130 physically resides in a base or frame portion of the electronic billboard device 101. Also, in various other embodiments, the back end 130 may be located remotely to the front end portion 110 and the network 120 may be a local area network, wireless local area network or other suitable network connection. Also, it should be appreciated that portions of or the entire back end portion 130 may be shared by multiple front end portions 110.

Figure 3:
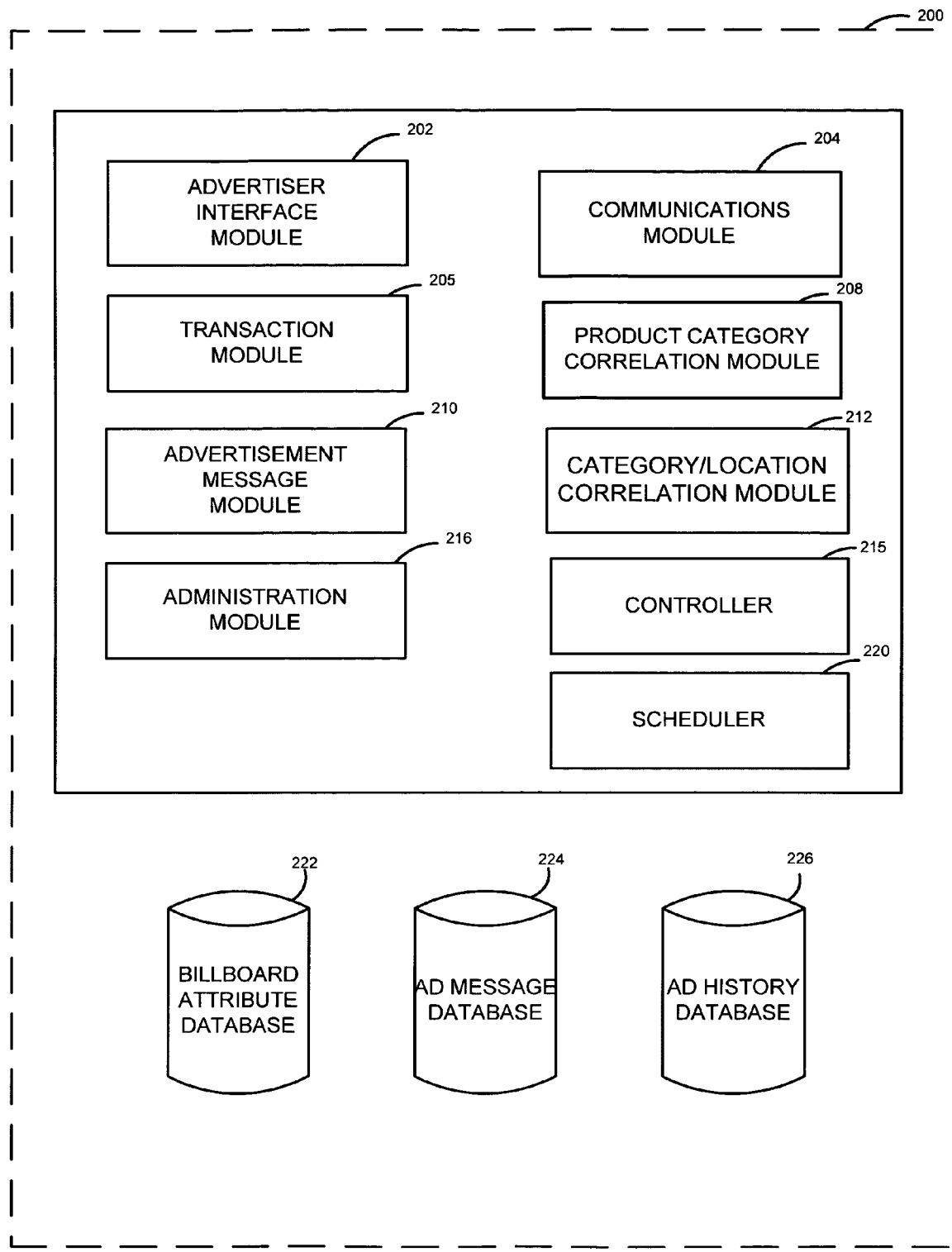
FIG. 3 is a block diagram illustrating various components of an advertising server for use with a system for managing a distributed network of electronic billboards and for allocating advertising space in the network based on a correlation between products/concept promoted in an advertising message and attributes of the each billboard according to at least one embodiment of the invention.

Referring now to FIG. 3 an advertising server for an electronic billboard-based advertising system is illustrated in accordance with at least one embodiment of the invention. The server 200 comprises various modules and databases which may provide functionality that enables the billboard to display advertisements based on demographic attributes of the current audience. It should be appreciated that each module may be configured as a software application executing on computer hardware, an application specific integrated circuit (ASIC), a combination of hardware and software, or other suitable configuration. Moreover, modules may be combined or broken into multiple additional modules.

A communication module 204, such as, for example, a network interface card and corresponding device drivers may enable two-way communication between the various electronic billboard devices and the advertising server 200. As noted above, advertisements to be output by the individual billboards may be transmitted to billboard for output. The communication module 204 may also facilitate communication with the server 200 by other entities to facilitate operations such as maintenance, software upgrades, advertising uploads and replacement, etc.

The sensor data input module advertiser interface module 202 may provide an interface, such as, for example, a web-based interface for advertisers to interact with the ad server 200 to perform operation such as purchasing ad space and uploading creating advertisements.

An advertisement upload module 210 may interact with the advertiser interface module 202 to facilitate uploading of advertisement messages to the server 200. In various embodiments, uploaded advertisement messages are stored in an advertisements database 224. While in various embodiments, it is contemplated that the advertisement messages is a output file such as an encoded digital video file, the advertisement messages that is uploaded to the server 200 may also comprise a complied or uncompiled computer program written in any suitable programming language or environment.

In various embodiments, the transaction module 205 may allow advertisers to specify terms such as maximum dollar amount to be spent per month on advertisement messages, maximum amount per impression or impression unit of time, i.e., seconds, specific billboard locations desired, specific billboard locations to be avoided, and methods of payment.

In various embodiments the product category correlation module 208 may either alone or in combination with information provided by the advertiser through the advertiser interface module 202, identify one or more categories of products and/or keywords that are associated with the product promoted in the advertiser's uploaded message. For example, the advertiser may select a keyword such as "shoes" or "footware." Also, the advertiser may specify that the product is for a particular product and the category correlation module 208 may refer to correlation data, such as historical search engine data that suggests that persons searching for the advertiser's product also searched for other products or categories of products and these products or categories of products may be correlated to the uploaded advertisements.

In various embodiments, a category/location correlation module 212 may correlate the uploaded advertisement message based on the specified product categories or keywords with attributes of individual electronic billboards as stored in the billboard attribute database 222. For example, a particular billboard stored in the attribute database 222 may have the attribute of being near shoe stores or general department stores known to sell shoes. Thus, a list of electronic billboards having attributes that are correlated to the product category and/or keyword associated with the advertisement message may be created. In various embodiments, a schedule module 220 may then, based on the budget parameters specified by the advertiser and the list of electronic billboards having attributes that are correlated to the product category and/or keyword associated with the advertisement message may devise an advertising campaign schedule. In various embodiments, this schedule, along with the advertisement messages may be sent to the one or more electronic billboards included in the campaign by the communications module 204 over a communications network.

Each module listed in the server 200 may operate autonomously or under the control of the controller 218. For example, in various embodiments, the controller 218 may be a CPU of the server 200. Furthermore, it should be appreciated that the particular modules illustrated in FIG. 3 are exemplary only and should not be construed as either necessary or exhaustive. In various embodiments, it may be desirable to use more, less or even different modules than those illustrated in FIG. 3. Also, as noted above, it should also be appreciated that the advertising server 200 may also be configured as more than one server or a distributed network of servers and that the advertisement database 224, the billboard attribute database 222 and/or the ad history database 226 may actually be located remote from the server 200 and accessible over a network.

An administration module 216 permits system administrative functions such as one or more of the following: remote powering on and off, setting access control, software updates, performance monitoring, statistic gathering and/or other administrative functions not directly related to advertisements.

Exemplary Advertising Allocation Process

Figure 4:
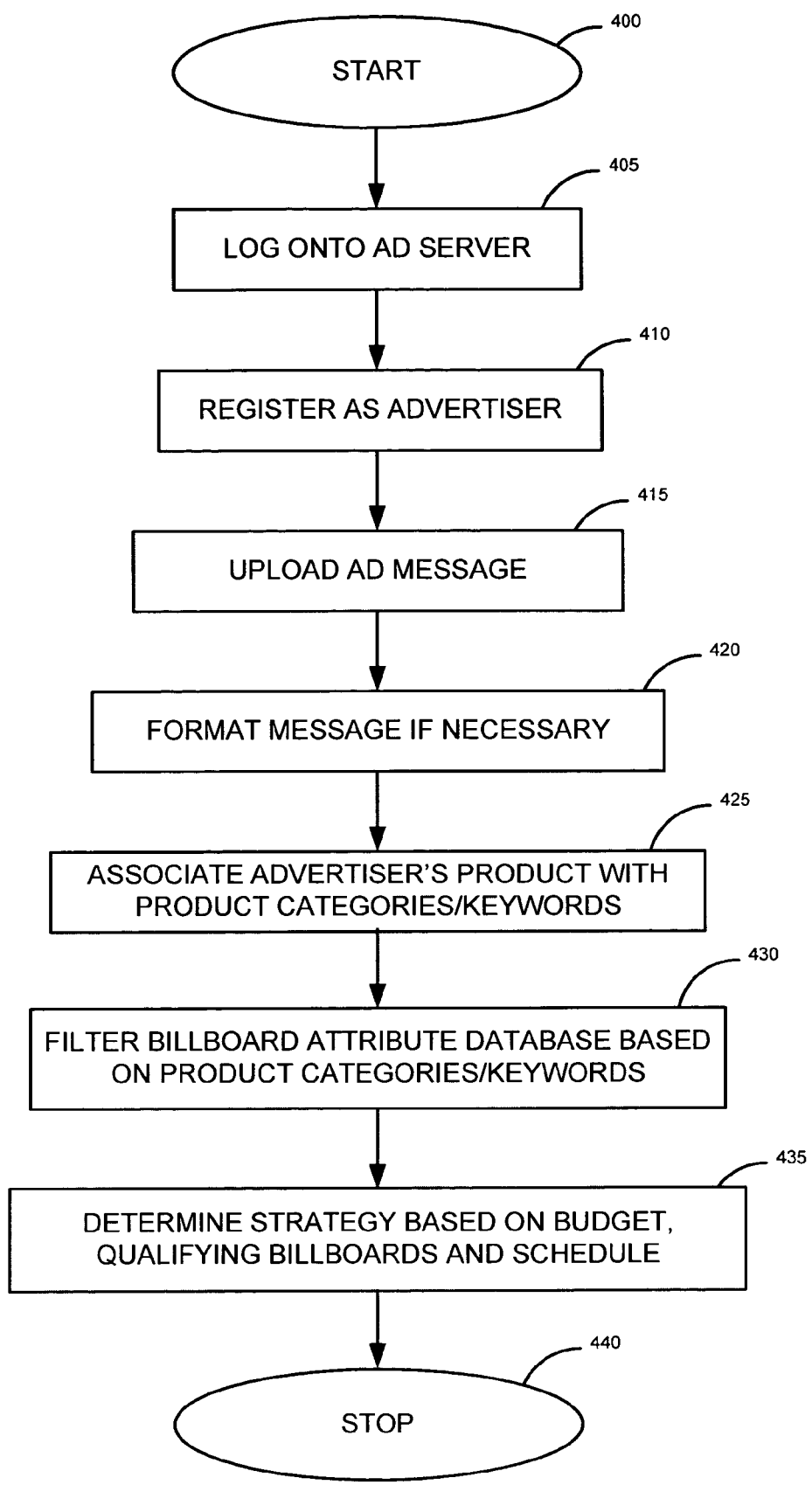
FIG. 4 is a flow chart illustrating a method for interfacing with an advertising server and allocating advertisement messages over available electronic billboards based on a correlation between the product/concept promoted in the advertisement messages and attributes of the electronic billboards according to at least one embodiment of the invention.

Referring now to FIG. 4, a flow chart illustrating a method for interfacing with an advertising server and allocating advertisement messages over available electronic billboards based on a correlation between the advertiser's product and attributes of the electronic billboards according to at least one embodiment of the invention.

Operation begins in block 400. In block 405, the advertiser may log into the ad server. As discussed herein, in various embodiments, this can be performed using a web browser interface. In block 410, the advertiser may register as an advertiser on the system. In various embodiments, this may comprise specifying information such as categories of goods to be advertised, preferred payment methods, duration of desired participation, etc. In block 415, the advertiser may upload an advertisement message to the ad server. In various embodiments the may include uploading multiple files in various different output formats, such as, for example voice, text, coupons, etc. that can be suited to each different output format. In block 420, any formatting may be performed. For example, this may comprise changing a format of the message file, formatting the length, compressing, decompression or performing any other format operation on the advertisement message.

In block 425, the advertisement message may be associated with one or more product categories and/or keywords/concepts. As discussed above, in various embodiments, the advertiser may select one or more keywords from a list of available keywords/concepts. Also, the advertiser may specify his/her own keywords/concepts. In still further embodiments, the server may derive product categories and/or keywords/concepts based on correlations observed in historical search engine queries—persons searching for product A also searched for product B. In block 430, the billboard attribute database may be filtered based on the product categories and/or keywords/concepts selected in block 425 to derive a list of billboards that are intelligently correlated to the particular advertisement. In various embodiments, this may comprise generating a ranked list showing a correlation metric illustrating the relative level of correlation, such as, for example, a relevancy ranking that is returned in response to a search engine query. In various embodiments, co-queries may be performed by using methods such as thesaurus correlations. For example a shoe supplier may specify "sandals" as a keyword may also include other types of shoes such as "flip-flops," "boots," etc.

In block 435 an advertising strategy or campaign may be created by the ad server based on the advertiser's budget, and the ranked list of electronic billboards and existing scheduling obligations to other advertisers. In various embodiments, this schedule, along with the advertisement messages may be transmitted to the electronic billboard. Operation terminates in block 440.

It should be appreciated that in various embodiments, the advertisement message and schedule may remain at the advertising server and the ads are simply sent to the appropriate billboard according to the schedule so that the billboard serve simply as output devices, outputting advertisements, in real or near real time, in response to messages being received at the billboard devices.

Figure 5:
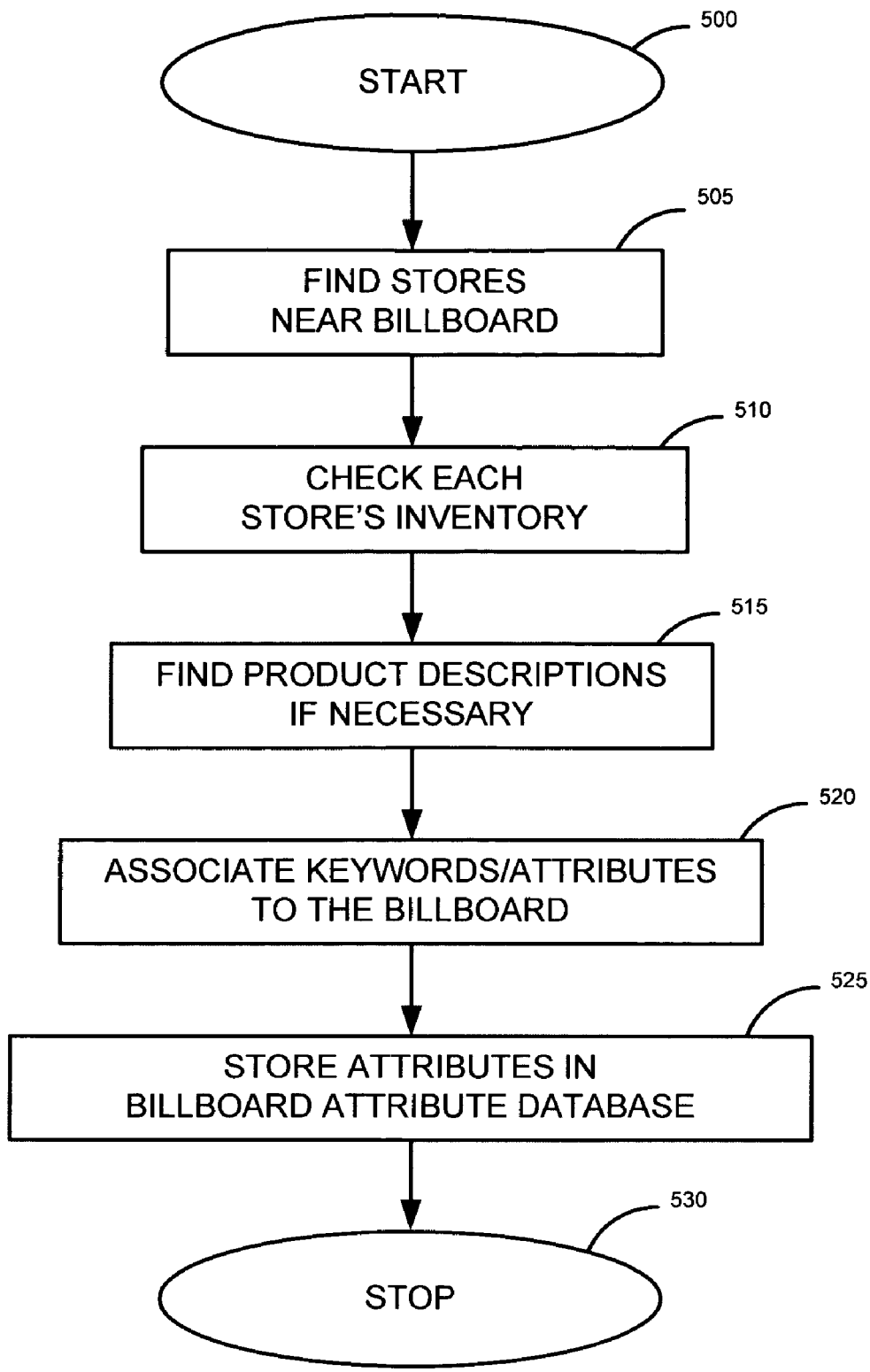
FIG. 5 is a flow chart illustrating a method for defining a set of attributes for an electronic billboard based on the billboard's proximity to retail outlets in accordance with at least one embodiment of the invention.

Referring now to FIG. 5, a flow chart illustrating a method for defining a set of attributes for an electronic billboard based on the billboard's proximity to retail outlets in accordance with at least one embodiment of the invention is illustrated. The method begins in block 500. In block 505, a determination may be made of the types and names of stores in proximity to the billboard. This may comprise manually inspecting the retail or other area in which the billboard may be located to define a list of location-based attributes for the billboard. In addition, Internet search engine containing local retail information, such as, for example, "local.google.com" or "local.yahoo.com" may be used to identify attributes. Also, in various embodiments, commercially available information such as dvd or cd-based maps used in GPS automobile navigation systems. In still further embodiments, information directories such as telephone directories may be used to define location-based attributes. Any of these techniques may be used alone or in combination with each other to determine the types and names of stores in proximity to the billboard.

In block 510, the individual stores' inventory may be checked for products and product categories so that a list of products, products, and or product categories can be defined for each retailer in proximity to each billboard so that these products and/or product categories can be associated with the particular billboard. In various embodiments, this may be done manually, automated, or through a combination of automated and manual processes. In various embodiments store inventories may be checked by examining retailers' web sites or retail aggregators such as the website "froogle.com" where merchants often upload their catalogs of products.

In block 515, product descriptions of the retailers' products may be found. For example, if the product lists are found through an automated process, products may only be listed by name or number. Thus, in various embodiments, product descriptions may be determined so that keywords/concepts or other descriptions may be derived for each product. In various embodiments, product names and/or descriptions may be found by searching the Internet using the product id or name. In reply to this type of search, content including retailer defined descriptions as well as search engine extracted description such as key word(s) in context will be returned. In block 520, based on the information obtained blocks 5105, 510 and 515 one or more various keywords/attribute are defined for each billboard. In block 525 the keywords/attributes determined for the billboard may be stored in a billboard attribute database. The process terminates in block 530.

Figure 6:
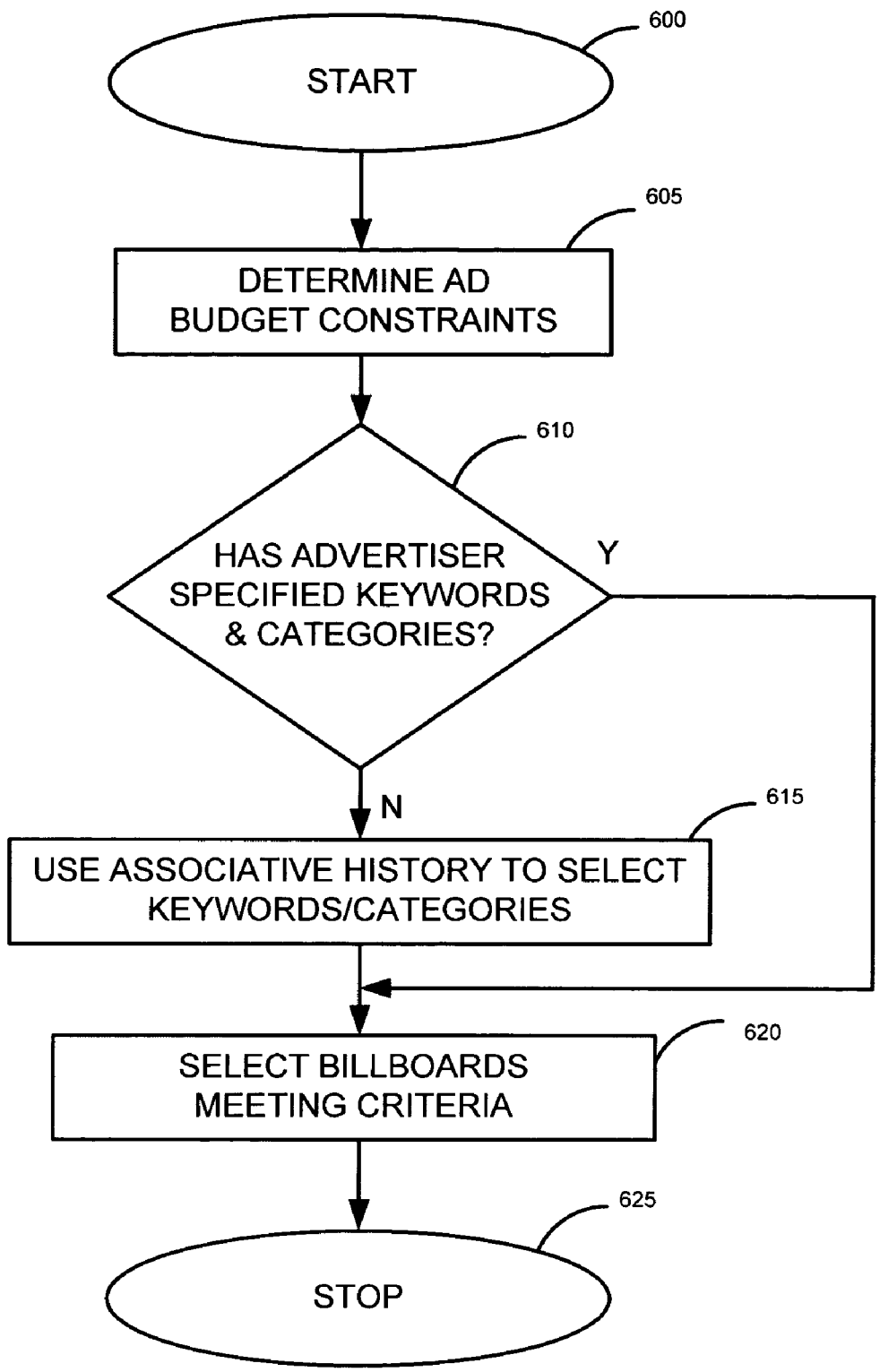
FIG. 6 is flow chart illustrate a method for scheduling advertisement messages for display over a network of electronic billboards based on budget constraints and an association between the product/concepts promoted in the advertisement message and attributes of electronic billboards in accordance with at least one embodiment of the invention.

Referring now to FIG. 6, a flow chart illustrate a method for scheduling advertisement messages for display over the network of electronic billboards based on budget constraints and an association between the advertiser's product and attributes of electronic billboards in accordance with at least one embodiment of the invention is depicted. Operation of the method begins in block 600. In block 605 budget constraints associated with the advertisement message may be determined. As discussed herein, in various embodiments, an advertiser may specify a total monthly budget along with a maximum per impression rate. Also, the advertiser may specify one or more specific billboards, or general billboard locations which may then trigger a particular rate. For example, rates may be specific to particular billboards, times of day or combinations of each. Also, pricing schemes may be non-linear to the extent purchasers of large amounts of ad space/time may enjoy relatively lower per impression rates than small purchasers. Various pricing schemes may allow an advertiser to pay per impressions, that is per showing or output of the ad, pay per impression when the board is able to insure that persons are standing in front or near the billboard using various sensor technology, pay per unit of time, pay for a specific type of interaction such as handing out a coupon or other incentive, pay on redemption of the coupon or pay additionally for redemptions, etc. Furthermore, the cost a specific billboard may vary according to several facts such as the demand for that billboard, the location of the billboard, terms specified by the owner of the billboard, the time of day, the particular technology of the billboard, such as the above mentioned sensing technology operable to determine when persons are actually present in front of or near the billboard, etc.

With continued reference to FIG. 6, in block 610, a determination may be made as to whether the advertiser has specified keywords or categories that are to be associated with the advertiser's advertisement message. If the advertiser has not specified any key words or product categories, operation goes to block 615. Otherwise, if in block 610 it is determined that the advertiser has specified one or more keywords and/or product categories, operation goes to block 620.

In block 615, keywords and/or product categories relating to the advertisement message may be selected through automated processes. For example, in various embodiments, if the advertiser's product is a product for which no keyword or product category is provided or easily obtained, techniques such as co-query history may be used to determine one or more key words or product categories. Using the product's name or description provided by the advertiser, the advertising server may interrogate a database of search engine co-queries to determine if searches for the advertiser's product were also performed with searches for any other products or product categories so that a set of keywords or product category or categories may be associated with the advertisement. As noted above, thesaurus based co-queries may also be used.

In block 620, one or more billboards may be selected from a billboard attribute database that have the same attributes as the key word(s) or product categories determined in block 610 or 615. Based on the set of relevant billboards and the advertiser's specified budget constraints, an advertising campaign may be created by the server which may include information such as, location of billboards to output the advertising message, number of times a hour/day/month the message is to be output, date of expiration, etc. Operation terminates in block 625.

Figure 7:
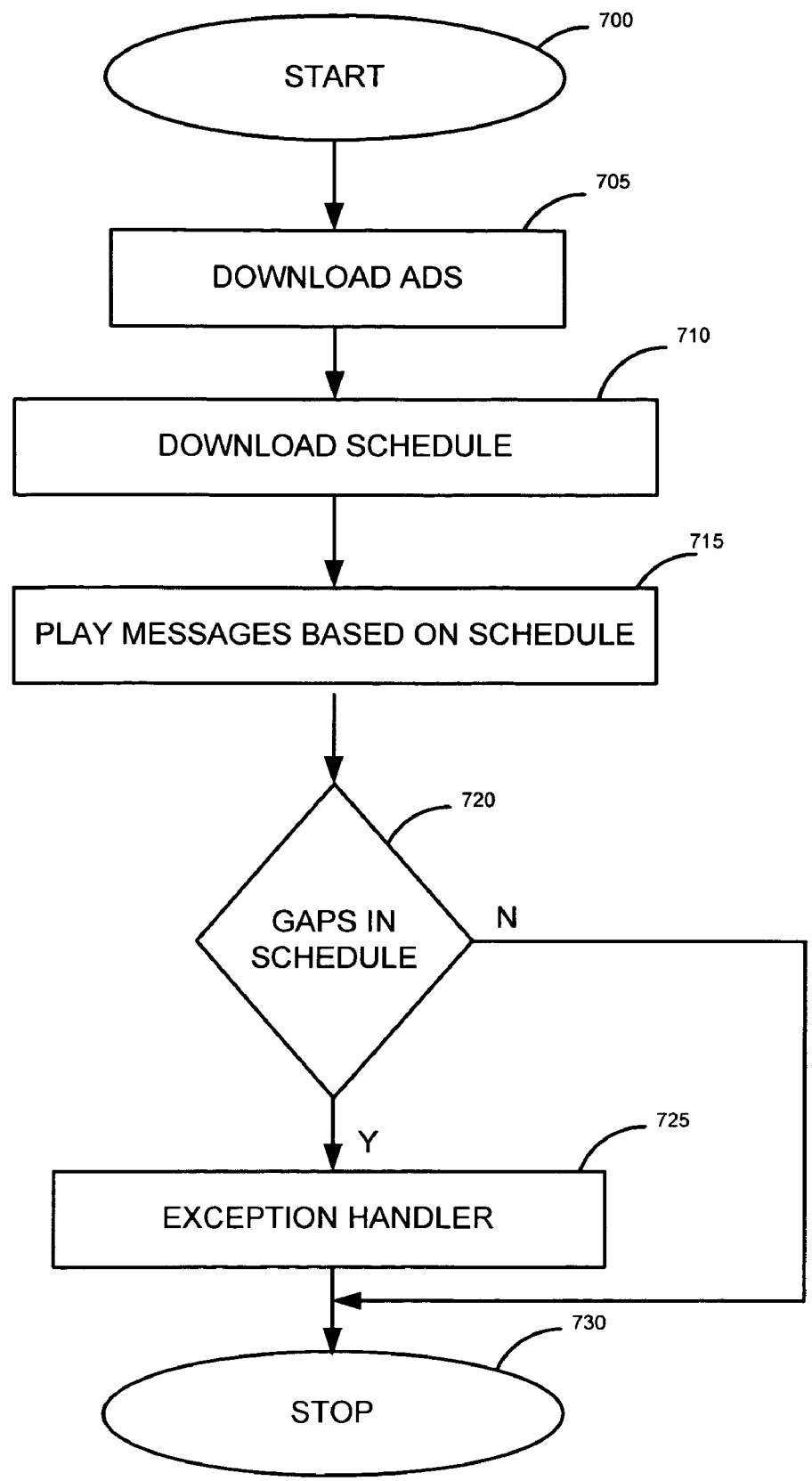
FIG. 7 is a flow chart illustrating a method for outputting advertisement messages on an electronic billboard based on predetermined and dynamic scheduling in accordance with at least one embodiment of the invention.

Referring now to FIG. 7, a flow chart illustrating a method for outputting advertisement messages on an electronic billboard based on predetermined and dynamic scheduling in accordance with at least one embodiment of the invention is depicted. Operation of the method begins in block 700. In block 705 advertisement messages are downloaded to the individual electronic billboard devices. In various embodiments, this may be done in real time, that is once an advertising campaign is determined. In various other embodiments, advertisement messages may be downloaded, such as, in a batch mode basis, that is once every time period such as once a day, or once every N hours. In block 710, a schedule may also be downloaded to the billboards corresponding to the advertisement messages. In various embodiments, the schedule may specify particular times and numbers of advertisement messages to be displayed per day. In various other embodiments, the schedule may be a list of parameters such as, at least N times per day, or at least N times between opening and closing. As with the advertisement messages, the schedule may be downloaded in real or near real time or in batch mode. Also, the schedule may be downloaded with the advertisement messages themselves as a schedule update to a master schedule. It should be appreciated that the schedule of advertisement messages to be displayed on a particular billboard can be updated at any time, such as, for example, whenever, an advertiser changes its campaign, budget constraints, etc., the schedule may be updated.

Referring now to block 715, advertisement message may be output based on the schedule. In block 720, the billboard may determine whether there are any gaps in the schedule—that is if, after outputting each message according to the "rules" imposed by the schedule, there is additional unallocated advertising space. If so, operation goes to block 725. Otherwise, operation goes to block 730.

In block 725, an exception handling process may be invoked to determine how to allocate the unallocated advertising space. In various embodiments, certain advertisement messages may be given left over space. In various other embodiments, advertiser may specify that they wish to pay for only this left over, unallocated space. Also, preferred customers, that is those buying relative more ad space, may be given additional advertisement messages during this unallocated space. Operation stops in block 730.

It should also be appreciated that the scheduling of advertisement messages on the available billboards may, in various embodiments, also be performed based on an auction model. That is, where advertisers will bid on any number of different combinations of location, time, number of impressions, etc. In various methods, scheduling of advertisement messages on the network of billboards may be performed in a manner analogous to the scheduling of banner ads to display in response to keyword queries on a search engine. Also, the choice of billboard may be based on a combination of factors such as relevance of the billboard to the specific advertisement message, how much the advertiser is willing to pay and the amount of available inventory (time) on the board. Various embodiments, may seek to maximize revenue generated from advertisers by allocating advertisement messages in a manner that extracts the maximum allowable budget from each advertiser while also maximizing advertiser utility and therefore, perceived and/or actual effectiveness. Advertiser may compete with one another for space by specifying that they will pay a certain amount or percent more than other advertisers selling related products. In addition, advertisers may specify that their advertisement messages are to appear before or after adds for other products, or never within a certain time period of advertisement messages for certain products.

Exemplary Embodiment

Figure 8:
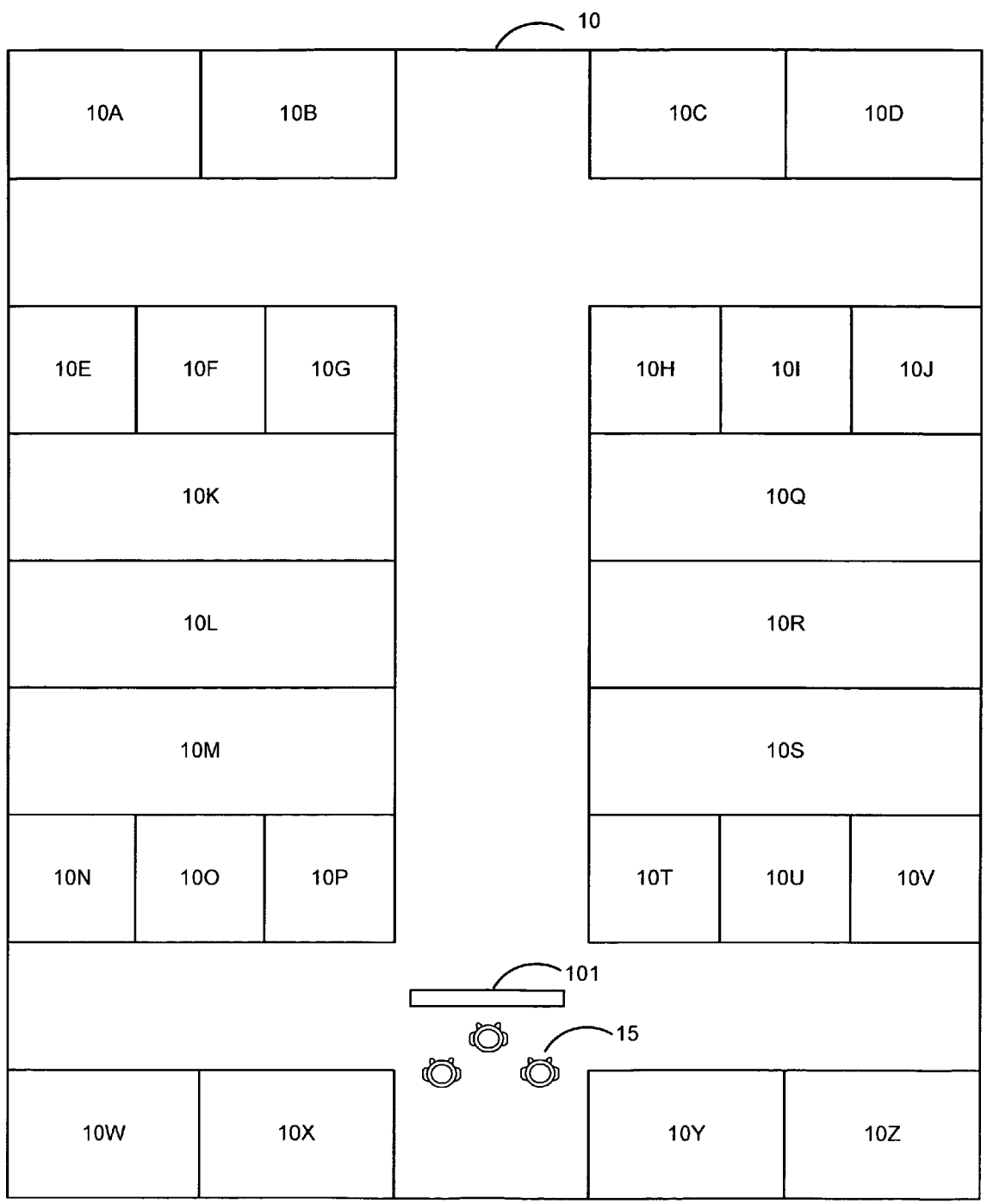
FIG. 8 is an overhead view of an electronic billboard in an exemplary retail outlet in accordance with at least one embodiment of the invention.

Referring now to FIG. 8, an overhead view of an electronic billboard in an exemplary retail outlet in accordance with at least one embodiment of the invention is illustrated. In the example depicted in FIG. 8, 3 persons 15 have entered the retail area 10. In various embodiments, the electronic billboard 101 may cycle through the list of available advertisement messages in accordance with the schedule. In various other embodiments, the billboard may remain idle until a sensor detects the presence of persons in proximity to a field of view of the billboard.

Continuing the example, of FIG. 8, the billboard may output an advertisement message for a particular brand owner's athletic shoes that is available at one or more of the retail locations 10A-10Z in the retail outlet 10. Because of the correlation between the product promoted and the attributes of the electronic billboard 101, that is the retailers or categories of retailers in physical proximity to the billboard 101, a gain in advertising effectiveness, and a corresponding gain in value for advertisers may be achieved. Moreover, by logically allocating advertisement messages to electronic billboards that share attributes with the products being promoted based on their proximity to retailers selling those products, the system may reduce the outputting of advertisement messages to audiences who are unable to purchase the goods being promoted anywhere near where they are viewing the advertisement message. Furthermore, statistics may be maintained for each electronic billboard on which advertisement messages were played when so that advertisers can determine the effective of their ad campaign by examining sales figures during the period of the campaign.

Thus, the various systems and methods for intelligently allocating advertising space in a network of electronic billboards based on a correlation between attributes each billboard and the products being promoted in the advertisement messages, gains in effectiveness for advertisers wishing to promote their products by playing advertisement messages near stores selling their product may be achieved. Also, advertisers may reduce "ineffective" advertisement messages that promote their products in areas in which the actual products can not be purchased. Furthermore, the systems and methods discussed herein provide an advertising channel that is useful to local, regional and nationwide advertisers. That is, region advertisers can specify that their advertisement messages appear only on electronic billboard in a particular retail outlet, city or region.

It should be understood that the server, processors, and modules described herein may perform their functions (e.g., reading optical information or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to advertisement messages, the principles herein are equally applicable to other documents and content. Indeed, various modifications of the embodiments of the present inventions, in addition to those described herein, may be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art may recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The invention claimed is:

1. A computer-implemented method comprising:
identifying a plurality of retailers within a predefined physical proximity of each of a plurality of displays in a network;
for each display:
identifying products sold by the plurality of retailers;
after identifying products sold by the plurality of retailers, identifying a set of keywords based on the identified products, wherein the set of keywords is not identified by any of the plurality of retailers, and
associating the set of keywords with the respective display;
associating an advertisement with at least one concept;
determining that a keyword associated with a display satisfies the concept;
selecting the advertisement to be output to the display having the keyword that satisfied the concept; and
providing the advertisement to be output to the display.

2. The method according to claim 1, wherein the display comprises an electronic billboard.

3. The method according to claim 1, wherein the concept comprises at least one item selected from the group comprising a keyword and a product category.

4. The method according to claim 1, wherein defining a set of keywords associated with the plurality of displays in the network further comprises:
storing the set of keywords associated with the respective display in a display attribute database.

5. The method according to claim 1, wherein associating the advertisement with at least one concept comprises:
receiving an indication of one or more concepts from an advertiser associated with the advertisement.

6. The method according to claim 1, wherein associating the advertisement with at least one concept comprises:
correlating a product advertised in the advertisement with a category of products.

7. The method according to claim 1, wherein associating the advertisement with at least one concept comprises:
correlating a product advertised in the advertisement with a related product.

8. The method according to claim 7, wherein correlating the product advertised in the advertisement with the related product comprises:

referencing historical co-product queries in a search engine product query database.

9. The method according to claim 1, wherein selecting the advertisement to be output to the display associated with the keyword that satisfied the concept comprises:
selecting the advertisement having at least one of the keywords as the concept.

10. The method according to claim 9, wherein selecting the advertisement to be output to the display comprises:
creating a list of available advertisements, wherein a relevance score is computed for each advertisement representative of the correlation between each advertisement and the keywords.

11. The method according to claim 1, wherein the advertisement is downloaded to the display over a communications network.

12. The method according to claim 11, wherein parameters relating to a number of times in a given time period that the advertisement is to be output on the display are downloaded.

13. The method according to claim 11, wherein parameters relating to a time period during which the advertisement is to be output on the display are downloaded.

14. The method according to claim 1, wherein the output is played on a video display screen of the display, or audio is played on an audio output system of the display.

15. The method according to claim 1, wherein a printed incentive advertisement is output on a printer output system of the display.

16. The method according to claim 1, wherein an electronic incentive is downloaded to an electronic storage media of a viewer of the document.

17. A system comprising:
one or more computers; and
a computer-readable medium coupled to the one or more computers having instructions stored thereon which, when executed by the one or more computers, cause the one or more computers to perform operations comprising:
identifying a plurality of retailers within a predefined physical proximity of each of a plurality of displays in a network;
for each display:
identifying products sold by the plurality of retailers;
after identifying the products sold by the plurality of retailers, defining a set of keywords associated with the respective display in the network based on the products, wherein the set of keywords is not defined by any of the plurality of retailers, and
associating the set of keywords with the respective display;
associating an advertisement with at least one concept;
determining that a keyword associated with a display satisfies the concept;
selecting the advertisement to be output to the display having the keyword that satisfied the concept; and
providing the advertisement to be output for presentation at the display.

18. The system according to claim 17, wherein the display comprises an electronic billboard.

19. The system according to claim 17, wherein the concept comprises at least one item selected from the group comprising a keyword and a product category.

20. The system according to claim 17, wherein defining a set of keywords associated with the plurality of displays in the network further comprises:
storing the set of keywords associated with the respective display in a display attribute database.

21. The system according to claim 17, wherein associating the advertisement with at least one concept comprises:
receiving an indication of one or more concepts from an advertiser associated with the advertisement.

22. The system according to claim 17, wherein associating the advertisement with at least one concept comprises:
correlating a product advertised in the advertisement with a category of products.

23. The system according to claim 17, wherein associating the advertisement with at least one concept comprises:
correlating a product advertised in the advertisement with a related product.

24. The system according to claim 23, wherein correlating the product advertised in the advertisement with the related product comprises:
referencing historical co-product queries in a search engine product query database.

25. The system according to claim 17, wherein selecting the advertisement to be output to the display associated with the keyword that satisfied the concept comprises:
selecting the advertisement having at least one of the keywords as the concept.

26. The system according to claim 25, wherein selecting the advertisement to be output to the display comprises:
creating a list of available advertisements, wherein a relevance score is computed for each advertisement representative of the correlation between each advertisement and the keywords.

27. The system according to claim 17, wherein the advertisement is downloaded to the display over a communications network.

28. The system according to claim 27, wherein parameters relating to a number of times in a given time period that the advertisement is to be output on the display are downloaded.

29. The system according to claim 27, wherein parameters relating to a time period during which the advertisement is to be output on the display are downloaded.

30. The system according to claim 17, wherein the output is played on a video display screen of the display, or audio is played on an audio output system of the display.

31. The system according to claim 17, wherein a printed incentive advertisement is output on a printer output system of the display.

32. The system according to claim 17, wherein an electronic incentive is downloaded to an electronic storage media of a viewer of the document.

* * * * *